(12) United States Patent
Kang et al.

(10) Patent No.: US 10,119,512 B2
(45) Date of Patent: Nov. 6, 2018

(54) MOBILE TERMINAL AND METHOD FOR CONTROLLING THE SAME

(71) Applicant: LG ELECTRONICS INC., Seoul (KR)

(72) Inventors: Cheol Kang, Seoul (KR); Hyungjoo Cheon, Seoul (KR); Cheegoog Kim, Seoul (KR); Mansoo Sin, Seoul (KR); Ramchan Woo, Seoul (KR); Changseok Cho, Seoul (KR); Kyungsoo Hwang, Seoul (KR); Sanghoon Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/650,280

(22) Filed: Jul. 14, 2017

(65) Prior Publication Data

US 2018/0245559 A1 Aug. 30, 2018

(30) Foreign Application Priority Data

Feb. 24, 2017 (KR) ........................ 10-2017-0024933

(51) Int. Cl.
*F02N 11/08* (2006.01)
*G07C 9/00* (2006.01)
*H04W 12/06* (2009.01)

(52) U.S. Cl.
CPC ...... *F02N 11/0807* (2013.01); *G07C 9/00309* (2013.01); *H04W 12/06* (2013.01); *G07C 2009/00341* (2013.01); *G07C 2009/00373* (2013.01); *G07C 2009/00412* (2013.01); *G07C 2009/00515* (2013.01); *G07C 2009/00547* (2013.01)

(58) Field of Classification Search
CPC ............ G06K 19/0723; G06K 7/0008; G06K 19/07749; G06K 19/0701; G06K 19/0707; G06K 19/0712; G06K 7/10356; G06K 7/10366
USPC ..................................... 340/10.34
See application file for complete search history.

(56) References Cited

U.S. PATENT DOCUMENTS

| 5,535,274 | A | * | 7/1996 | Braitberg | H02J 7/0004 |
| | | | | | 379/426 |
| 7,762,470 | B2 | * | 7/2010 | Finn | G06K 7/0004 |
| | | | | | 235/380 |
| 8,558,690 | B2 | * | 10/2013 | Kleve | H04M 11/04 |
| | | | | | 340/425.5 |

(Continued)

FOREIGN PATENT DOCUMENTS

DE 102011002128 A1 10/2012
KR 10-2010-0079311 A 7/2010

*Primary Examiner* — Mark Blouin
(74) *Attorney, Agent, or Firm* — Birch, Stewart, Kolasch & Birch, LLP

(57) ABSTRACT

The present invention relates to a mobile terminal capable of performing communication with a vehicle, and a method for controlling the same. A mobile terminal according to one embodiment of the present invention includes a terminal body, an antenna provided in the body, and a socket formed such that a vehicle key module is insertable, wherein the socket is located between the antenna and a printed circuit board (PCB) provided in the terminal body, such that the inserted vehicle key module is electrically connected directly to the antenna without passing through the printed circuit board.

22 Claims, 19 Drawing Sheets

(56) References Cited

U.S. PATENT DOCUMENTS

| | | | |
|---|---|---|---|
| 9,823,703 B2 * | 11/2017 | Eremenko | G06F 1/1658 |
| 9,843,375 B2 * | 12/2017 | Kim | H04B 1/006 |
| 9,912,792 B2 * | 3/2018 | Hahn | H04B 1/38 |
| 2009/0146830 A1 | 6/2009 | Ogiso | |
| 2012/0143707 A1 | 6/2012 | Jain | |
| 2013/0341414 A1 | 12/2013 | Ziller et al. | |
| 2015/0310684 A1 | 10/2015 | Ederie | |
| 2017/0249791 A1 * | 8/2017 | Woo | G07C 9/00111 |

\* cited by examiner

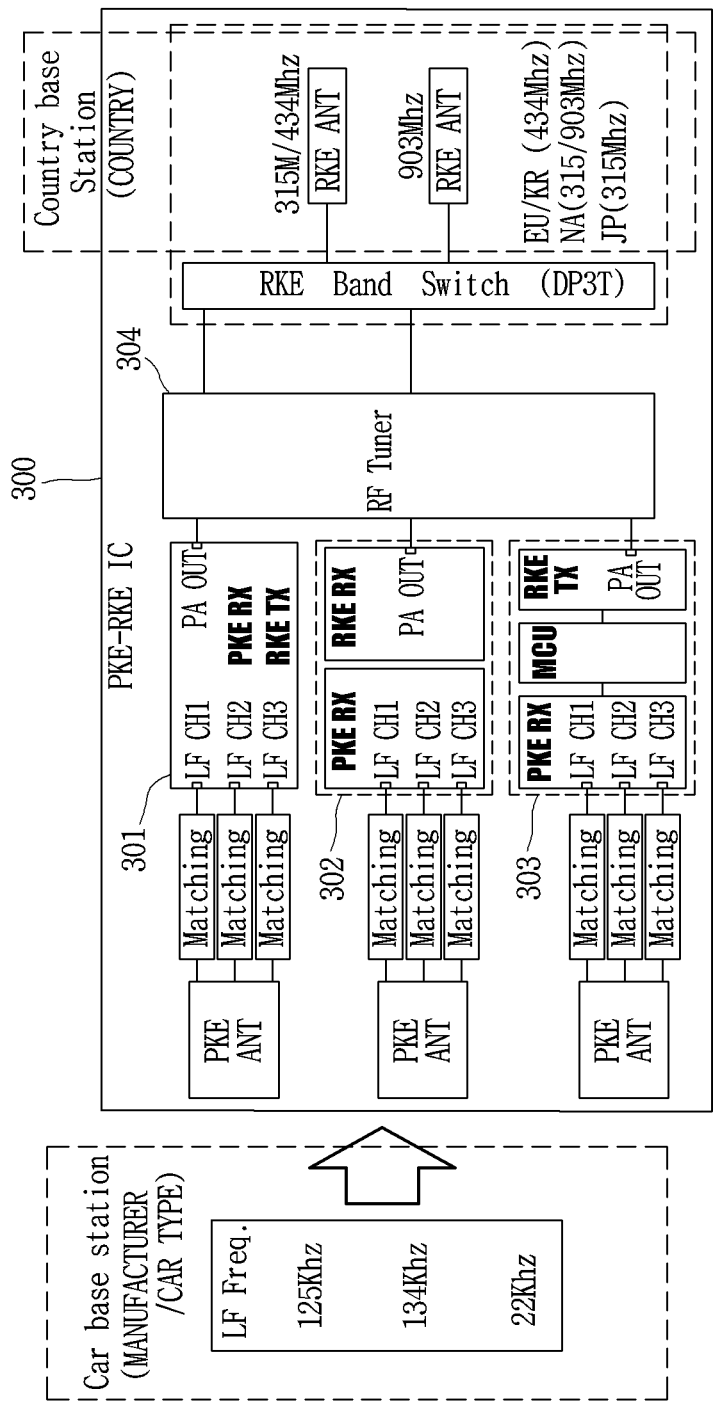

(a)

(b)

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2017-0024933, filed on Feb. 24, 2017, the contents of which are incorporated by reference herein in its entirety.

BACKGROUND OF THE INVENTION

1. Field of the Invention

This specification relates to a mobile terminal capable of performing communication with a vehicle, and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent time, a vehicle is provided with a Passive Keyless Entry (PKE)/Remote Keyless Entry (RKE) for opening and closing doors. Here, the PKE/RKE, for example, performs a function that a driver opens or closes the doors of the vehicle using a lock button or an unlock button.

In the related art, a driver has to carry a vehicle key (e.g., a physical vehicle key, key fob or smart key) for controlling the vehicle, and can lock/unlock the doors of the vehicle or drive the vehicle using the vehicle key.

However, recently, development of technologies for controlling a vehicle in a more convenient manner is actively undergoing.

SUMMARY OF THE INVENTION

Therefore, an aspect of the detailed description is to provide a mobile terminal capable of controlling a vehicle in an optimized manner.

Another aspect of the detailed description is to provide a card-type vehicle key module capable of being inserted into a mobile terminal.

Another aspect of the detailed description is to provide a mobile terminal in which a card-type vehicle key module can be inserted in an optimized manner.

Another aspect of the detailed description is to provide a mobile terminal capable of controlling a vehicle in an optimized manner using a card-type vehicle key module inserted in the mobile terminal.

To achieve these and other advantages and in accordance with the purpose of this specification, as embodied and broadly described herein, there is provided a mobile terminal, including a terminal body, an antenna provided in the terminal body, and a socket formed such that a vehicle key module is insertable, wherein the socket is located between the antenna and a printed circuit board (PCB) provided in the terminal body, such that the inserted vehicle key module is electrically connected directly to the antenna without passing through the printed circuit board.

In an embodiment disclosed herein, the socket may accommodate the vehicle key module such that pins provided on the vehicle key module are directly connected to the antenna.

In an embodiment disclosed herein, the socket may form an inner space between the antenna and the printed circuit board, such that the vehicle key module is accommodated in the inner space.

In an embodiment disclosed herein, the terminal body may be provided with a rear cover detachably coupled thereto, and the antenna may be embedded in the rear cover.

In an embodiment disclosed herein, the rear cover may be provided with antenna pins extending from the antenna, and the antenna pins may be directly connected to the pins of the vehicle key module inserted into the socket.

In an embodiment disclosed herein, the antenna may include a low frequency (LF) antenna and an ultra high frequency (UHF) antenna.

In an embodiment disclosed herein, the vehicle key module may include first pins connected to pins extending from the low frequency antenna, second pins connected to pins extending from the ultra high frequency antenna, and third pins connected to the printed circuit board.

In an embodiment disclosed herein, the first pins and the second pins may be provided on one surface of the vehicle key module, and the third pins may be provided on another surface opposite to the one surface of the vehicle key module.

In an embodiment disclosed herein, the socket may be coupled to the printed circuit board.

In an embodiment disclosed herein, the socket may be formed to be detachable from the terminal body.

In an embodiment disclosed herein, the socket may be formed such that the vehicle key module and a universal subscriber identity module (USIM) card are insertable.

In an embodiment disclosed herein, the socket may include a first space in which the vehicle key module inserted, and a second space in which the USIM card is inserted, and the first space and the second space may overlap each other.

In an embodiment disclosed herein, the socket may be formed such that the vehicle key module and the USIM card overlap different areas of the terminal body, respectively.

In an embodiment disclosed herein, the printed circuit board may be brought into contact with the antenna, and the socket may accommodate the vehicle key module such that the inserted vehicle key module is brought into contact with the antenna through the printed circuit board.

In an embodiment disclosed herein, the terminal body may be provided with a rear cover detachably coupled thereto, and the antenna may be embedded in the rear cover.

In an embodiment disclosed herein, the antenna provided in the rear cover may be brought into contact with one surface of the printed circuit board, and the socket may be provided on another surface of the printed circuit board.

In an embodiment disclosed herein, on the one surface of the printed circuit board may be provided fourth pins connected to the pins extending from the antenna, and on the another surface of the printed circuit board may be provided with fifth pins connected to the pins of the vehicle key module.

In an embodiment disclosed herein, the antenna may include a low frequency (LF) antenna and an ultra high frequency (UHF) antenna. The vehicle key module may include first pins connected to pins extending from the low frequency antenna, second pins connected to pins extending from the ultra high frequency antenna, and third pins connected to the printed circuit board. The first to third pins may be all arranged on one surface of the vehicle key module.

In an embodiment disclosed herein, the antenna may be provided in the printed circuit board, and the socket may be formed such that the inserted vehicle key module is connected to the antenna provided in the printed circuit board.

In an embodiment disclosed herein, the socket may be formed such that the inserted vehicle key module is connected to the antenna through the printed circuit board.

In an embodiment disclosed herein, the antenna may be provided in the socket, and may be formed such that the inserted vehicle key module is directly connected to the antenna provided in the socket.

In an embodiment disclosed herein, the mobile terminal may further include a controller, and the vehicle key module may include an antenna. The controller may perform communication with a vehicle using the antenna provided in the vehicle key module when the vehicle key module is inserted into the socket.

Effects provided by the mobile terminal and the method for controlling the same according to the present invention will be described as follows.

The present invention may provide an optimized mobile terminal, capable of controlling a vehicle by inserting a vehicle key module therein.

The present invention may provide a mobile terminal, capable of controlling a vehicle according to each country/vehicle type/manufacturer, regardless of a type, by using a vehicle key module inserted into the mobile terminal and an antenna provided in the mobile terminal.

The present invention may minimize a mounting area of a printed circuit is board of a mobile terminal and optimize an antenna performance, by way of electrically connecting a vehicle key module inserted into the mobile terminal directly to an antenna provided in the mobile terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 2A and 2B are conceptual views briefly illustrating a system according to the present invention;

DETAILED DESCRIPTION OF THE INVENTION

Figure 1A:
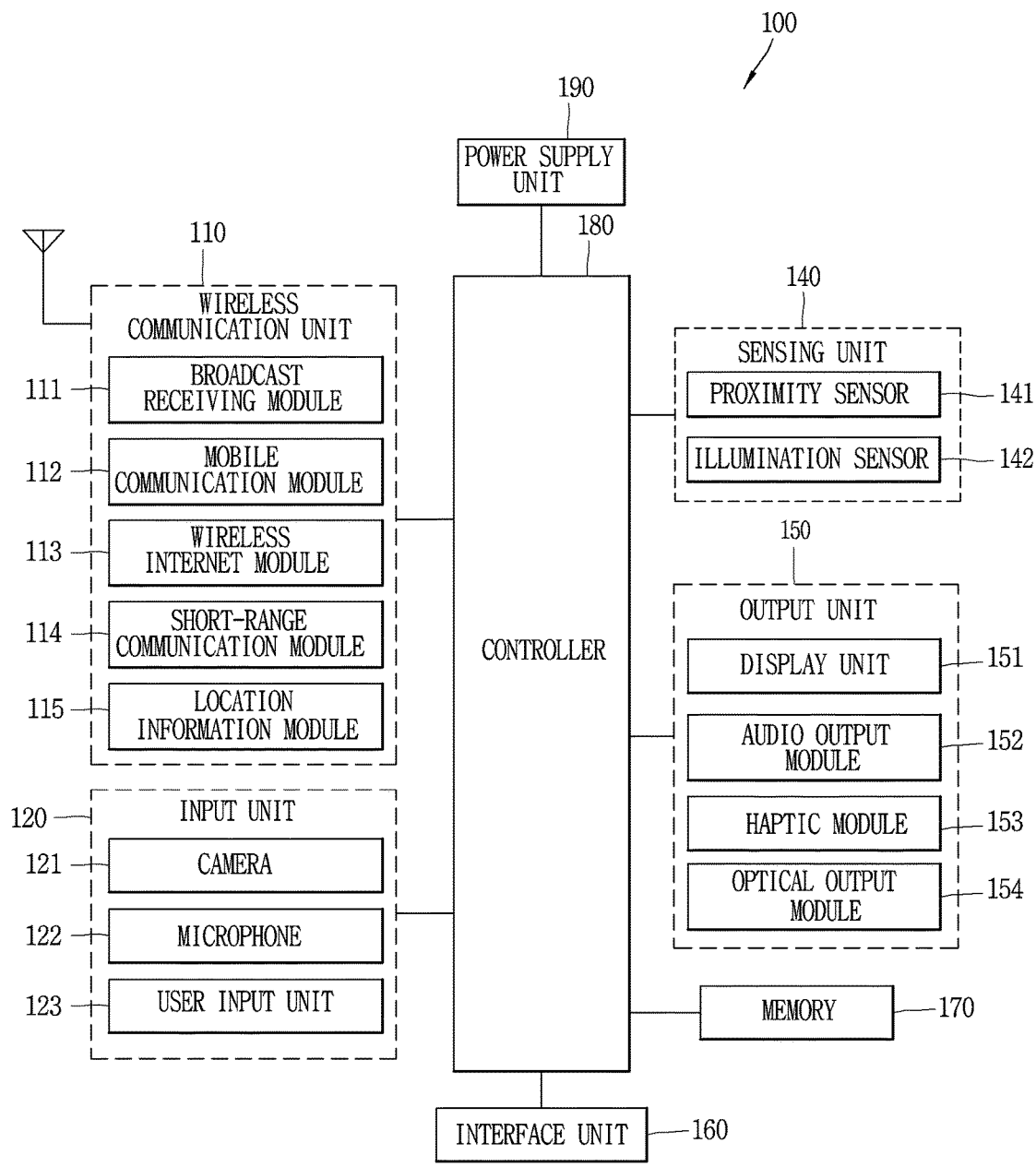
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
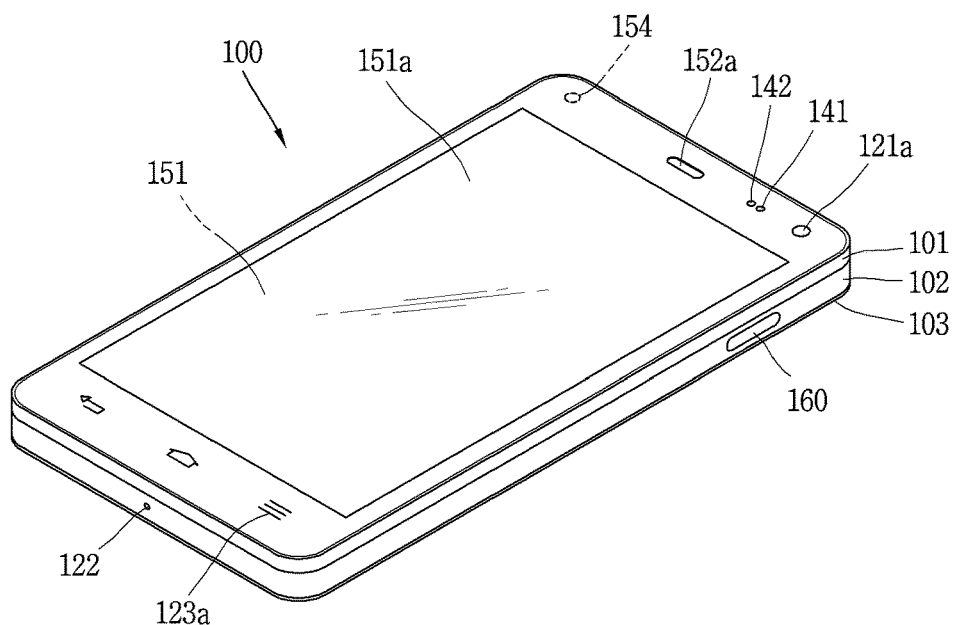
FIGS. 1B and 1C are conceptual views illustrating one example of the mobile terminal, viewed from different directions.
Figure 1C:
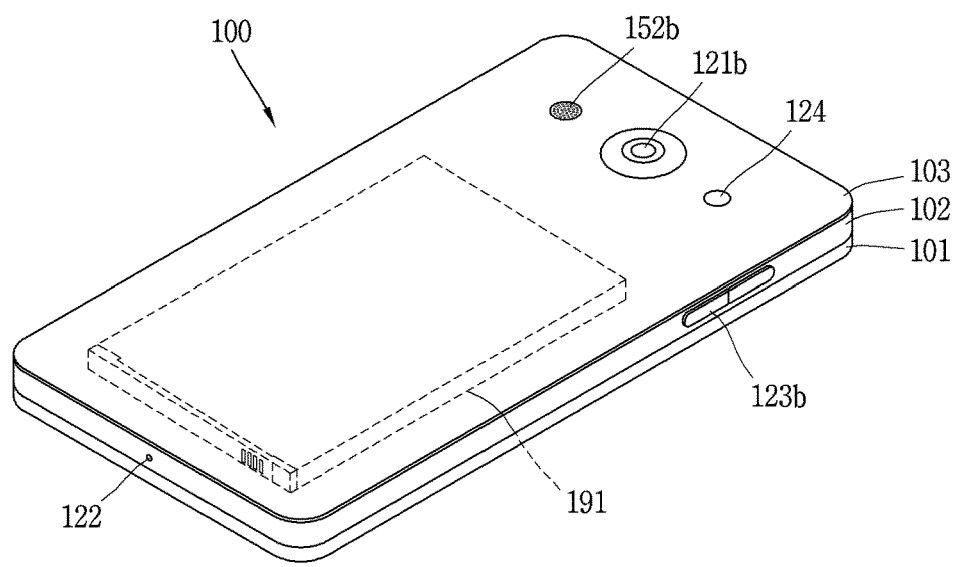

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The location information module 115 is generally configured to detect, calculate, derive or otherwise identify a position (or current position) of the mobile terminal. As an example, the location information module 115 includes a Global Position System (GPS) module, a Wi-Fi module, or both. If necessary, the location information module 115 may alternatively or additionally function with any of the other modules of the wireless communication unit 110 to obtain data related to the position of the mobile terminal.

The GPS module 115 can measure an accurate time and distance from three or more satellites, and accurately calculate three-dimensional (3D) current location information of the mobile terminal according to the latitude, longitude and altitude values by applying trigonometry to the measured time and distance. A method of acquiring distance and time information from three satellites and performing error correction with another single satellite may be widely used. Furthermore, the GPS module can acquire speed information by continuously calculating a current position in real time. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal 100, a wireless access point (AP) connected to the mobile terminal 100, and a database stored with wireless AP information.

The mobile terminal 100 connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. The included information and the received wireless AP information may be compared with each other so as to extract (or analyze) the location information of the mobile terminal 100.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

Among others, the NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Hereinafter, embodiments associated with a control method which can be implemented in the mobile terminal having such configuration will be described with reference to the accompanying drawings. It is obvious to those skilled in the art that the present disclosure can be specified into other particular forms without departing from the spirit and essential features of the present disclosure.

Meanwhile, the present invention may provide a general purpose smart key system using a mobile terminal. Specifically, the present invention can provide a general purpose smart key system configured to be applicable for each country/vehicle type/vehicle manufacturer by using a mobile terminal and a vehicle key module.

Hereinafter, a mobile terminal and a vehicle key module capable of controlling the vehicle will be described in more detail with reference to the accompanying drawings.

Figure 2B:
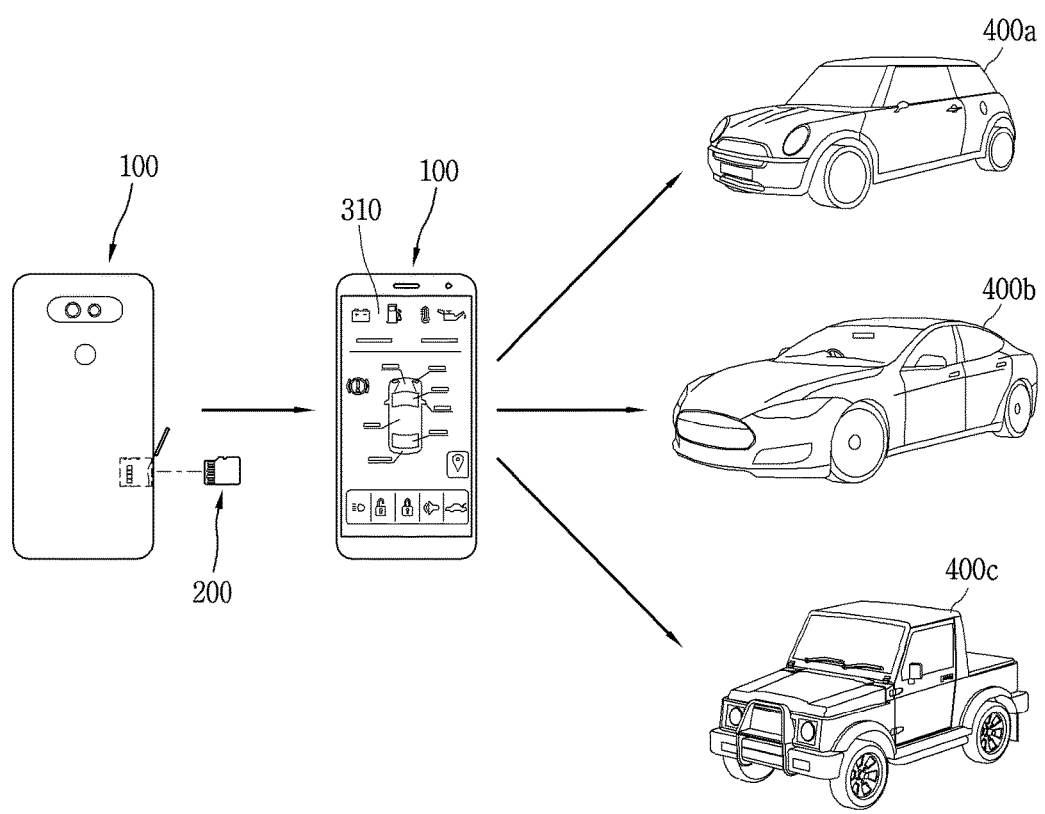

FIGS. 2A and 2B are conceptual views briefly illustrating a system according to the present invention.

First, as illustrated in FIG. 2A, a mobile terminal 100 or a vehicle key module 200 disclosed herein may include a Passive Keyless Entry/Remote Keyless Entry Integrated Circuit (PKE-RKE IC) 300.

The PKE-RKE IC 300 may be configured to perform a PKE function and/or an RKE function.

Here, the PKE function may include a function of allowing a user to lock/unlock a car door by simply holding a car key (vehicle key module) without operating the vehicle key module, to open a trunk (or glove box, etc.) of the vehicle, or start an engine of the vehicle.

For example, the PKE function may include an operation of locking or unlocking the door of the vehicle when a lock button/unlock button provided on the vehicle (e.g., a handle of the car door) is pressed while the vehicle key module exists within a predetermined distance of the vehicle.

As another example, the PKE function may include an operation of opening a trunk of the vehicle when a button provided on a part of the trunk is pressed while the vehicle key module is within a predetermined distance from the trunk.

As another example, the PKE function may include an operation of starting an engine of the vehicle only when the vehicle key module exists in the vehicle. This operation may be understood as an immobilizer function.

A Low Frequency (LF) antenna and/or Ultra High Frequency (UHF) antenna may be used for the PKE function. Here, the UHF antenna may be generally referred to as a Radio Frequency (RF) antenna.

An example of the PKE function is described as follows.

The LF antenna may be provided at each portion of the vehicle (e.g., at the front of the vehicle, at each door of the vehicle, at the rear of the vehicle (e.g., trunk), or within the vehicle).

The low-frequency signal transmitted from the LF antenna may be set or designed to be transmitted up to a predetermined distance (for example, about 1 m).

When a user's operation applied to the vehicle is performed (for example, pressing a button provided on a handle of a car door or moving close to a specific portion of the vehicle), the vehicle may transmit a low frequency signal through the LF antenna provided on a portion where the user's operation has been detected (or at least one LF antenna provided in the vehicle).

When a low frequency signal is received through an LF antenna (or a PKE antenna) provided in the PKE-RKE IC 300, a vehicle key (vehicle key module) may transmit a high frequency signal to the vehicle through a UHF antenna (RKE antenna) in response to the received low frequency signal.

When the low frequency signal is normally received through the LF antenna (or the PKE antenna) provided in the PKE-RKE IC 300, the vehicle key (vehicle key module) may also transmit a response signal (low frequency signal) to the vehicle through the LF antenna (or PKE antenna).

The vehicle may lock/unlock the vehicle door, open the trunk, or start its engine, based on the high frequency signal or the low frequency signal received from the vehicle key (vehicle key module).

For example, if the received signal has an authorized frequency, has a specific frequency pre-associated with the vehicle, or includes authentication information, the vehicle may perform an operation corresponding to the user's operation (e.g., locking/unlocking the vehicle door with the lock button/unlock button pressed, opening the trunk, starting the vehicle, etc.).

The RKE function may refer to a function of remotely controlling the vehicle using the vehicle key (vehicle key module).

For example, when a button provided on the vehicle key (vehicle key module) (for example, a door lock/unlock button, a klaxon output button, a trunk opening button, a start button, etc.) is selected, a high frequency signal associated with the selected button may be transmitted to the vehicle through the UHF antenna (or RF antenna) provided in the PKE-RKE IC 300.

The vehicle may perform a function corresponding to the button (e.g., locking/unlocking the vehicle door, outputting klaxon, opening the trunk, starting the vehicle, etc.), based on the high frequency signal received from the vehicle key (vehicle key module).

The high frequency signal transmitted through the UHF antenna may be transmitted to a farther distance than the low frequency signal transmitted from the LF antenna. For example, the high frequency signal may be transmitted up to several tens to several hundred meters.

The PKE-RKE IC 300 configured to perform the PKE function and/or the RKE function may be provided in the mobile terminal and/or the vehicle key (vehicle key module).

In this instance, as illustrated in FIG. 2A, in the PKE-RKE IC 300, a control unit for controlling the PKE/RKE function may be configured in a form of one chip 301, two chips 302 including a first chip performing the PKE function and a second chip performing the RKE function, and three chips 303 separately including an MCU in addition to the first chip and the second chip.

In addition, the PKE-RKE IC 300 may include a tuner 304 for tuning a frequency (high frequency) transmitted from the UHF antenna.

On the other hand, the low frequency and high frequency used for communication with the vehicle may be different for each company/vehicle type/country.

For example, the low frequency signal used for the PKE function may have a frequency (or a frequency band) of 125 Khz, 134 Khz, 22 Khz, etc., and the high frequency signal used for the RKE function may have a frequency (or frequency band) of 315 Mhz, 434 MHz, 903 Mhz, etc.

The mobile terminal and/or the vehicle key module of the present invention, as illustrated in FIG. 2A, may be provided with a plurality of LF antennas (PKE antennas) and a plurality of UHF antennas (a plurality of UHF antennas).

Also, the PKE-RKE IC 300 provided in the mobile terminal and/or the vehicle key module may set a low frequency and a high frequency so as to perform communication with the user's vehicle according to a user setting. When the vehicle is changed, the low frequency and the high frequency may be reset to perform communication with the changed vehicle through a predetermined authentication process.

With such configuration, the present invention may provide a mobile terminal and a vehicle key module, capable of controlling all kinds of vehicles, namely, generally controlling the vehicle by using one mobile terminal (or vehicle key module).

The PKE function and the RKE function may include various operations related to the vehicle in addition to the operations described above, and are not limited to the aforementioned operations.

In addition, the PKE/RKE function may be referred to as a PKE/RKE technology and RKE technology or PKE/RKE.

Meanwhile, since a hardware space is likely to be insufficient to embed software and an antenna type (frequency used) for each country/vehicle type/vehicle manufacturer in the PKE-RKE IC, a main chipset (MCU for controlling the PKE/RKE function, memory, etc.) may be implemented in a card form, and components such as an LF antenna and a UHF antenna, which occupy a large space, may be replaced with an antenna provided in the mobile terminal.

That is, the vehicle key module of the present invention may be formed in a form of a card such as a USIM card or an SD card so as to be insertable into the mobile terminal. The vehicle key module may be inserted into the mobile terminal so as to control the vehicle through the antenna provided in the mobile terminal.

At this time, the vehicle control may be performed by the controller 180 of the mobile terminal or the MCU (or processor) included in the vehicle key module.

For example, as illustrated in FIG. 2B, a main chipset 301, 302 or 303 (or the processor (MCU) performing the PKE/RKE function, the memory, etc.) of the vehicle key module may be provided in the card-type vehicle key module 200, and the card-type vehicle key module 200 may be inserted into the mobile terminal 100 to perform communication with the vehicle through the antenna provided in the mobile terminal.

Firmware (or firmware for performing the PKE/RKE function) and/or an authentication key for operating the main chipset may be stored in the memory.

The authentication key may refer to information used for authentication of the mobile terminal and the vehicle key module.

The mobile terminal may be provided with an LF antenna and a UHF antenna necessary for communication with the vehicle, and a frequency of a signal necessary for the communication with the vehicle may be set (varied) under the control of the controller 180.

The vehicle key module 200 may mean a key including a function of controlling the vehicle 300, a FOB module, a vehicle electronic key, a smart vehicle key, and the like. The vehicle key module 200 in this specification may be implemented in a form of a card, such as a USIM card or an SD card, which is insertable into the mobile terminal.

Referring to FIG. 2B, when the card-type vehicle key module 200 is inserted (mounted), the controller 180 of the mobile terminal 100 may execute an application linked with a function of controlling the vehicle. An execution screen 310 of the application may be output on a touch screen of the mobile terminal 100, for example.

Various information may be output on the execution screen 310 of the application. For example, the execution screen 310 of the application may include an icon indicating a state of the vehicle, internal/external temperature of the vehicle, tire air pressure, a parking position, a graphic object associated with a function of starting the vehicle, a graphic object associated with a function of locking/unlocking a door of the vehicle, a graphic object associated with a function of opening/closing a trunk of the vehicle, a graphic object associated with a function of outputting a klaxon of the vehicle, and the like.

When a touch is applied to any one of the graphic objects, the controller 180 may transmit a signal related to a function associated with the touch-applied graphic object to the vehicle 300 through the vehicle key module 200. The vehicle 300 may perform a function corresponding to the received signal.

The controller 180 may receive information related to the vehicle controllable by the inserted vehicle key module 200. At this time, the information related to the vehicle may include an identification number of the vehicle, control authority of the vehicle, frequency information related to a low frequency signal and a high frequency signal used for performing communication with the vehicle, information related to firmware (application) linked with a function of controlling the vehicle or link information for downloading the firmware, and the like.

The vehicle key module 200 may transmit the information related to the vehicle to the mobile terminal 100 when a preset condition is satisfied.

For example, the controller 180 of the mobile terminal 100 may output screen information for requesting authentication with respect to the vehicle key module 200 when it is determined that the vehicle key module 200 is inserted. When the authentication is succeeded through the screen information, the controller 180 may receive the information related to the vehicle from the vehicle key module 200.

As another example, when the vehicle key module 200 is inserted into the previously authenticated mobile terminal 100 (or when an authentication key stored in the vehicle key module 200 matches an authentication key prestored in the mobile terminal 100 or when the authentication is succeeded using the authentication key stored in the vehicle key module 200), the controller 180 may receive the information related to the vehicle from the vehicle key module 200 based on the insertion.

The authentication method for the vehicle key module 200 inserted into the mobile terminal 100 is not limited to the above-described method. For example, during the authentication process, additional information received from an external server (for example, an over-the-air server (OTA)) may be used.

The controller 180 may change information of a vehicle desiring to control according to a user request. For example, when the user's vehicle is changed, the user may change software through the mobile terminal 100 without replacing a separate vehicle key module, and reset a frequency of a signal for performing communication with the changed vehicle.

With the configuration, as illustrated in FIG. 2B, the present invention can provide a general vehicle smart key, which is capable of controlling all kinds of vehicles 400a, 400b, and 400c by inserting the vehicle key module having the main chipset required for the vehicle control into the mobile terminal and using signals of different frequencies for each country/vehicle type/vehicle manufacturer through the antenna provided in the mobile terminal.

Further, with the configuration of the present invention, the vehicle can be controlled in an optimized manner using only the mobile terminal without having a separate vehicle key.

Hereinafter, a method of controlling a mobile terminal when a card-type vehicle key module is inserted into the mobile terminal according to an embodiment of the present invention will be described in detail with reference to the accompanying drawings.

Figure 3:
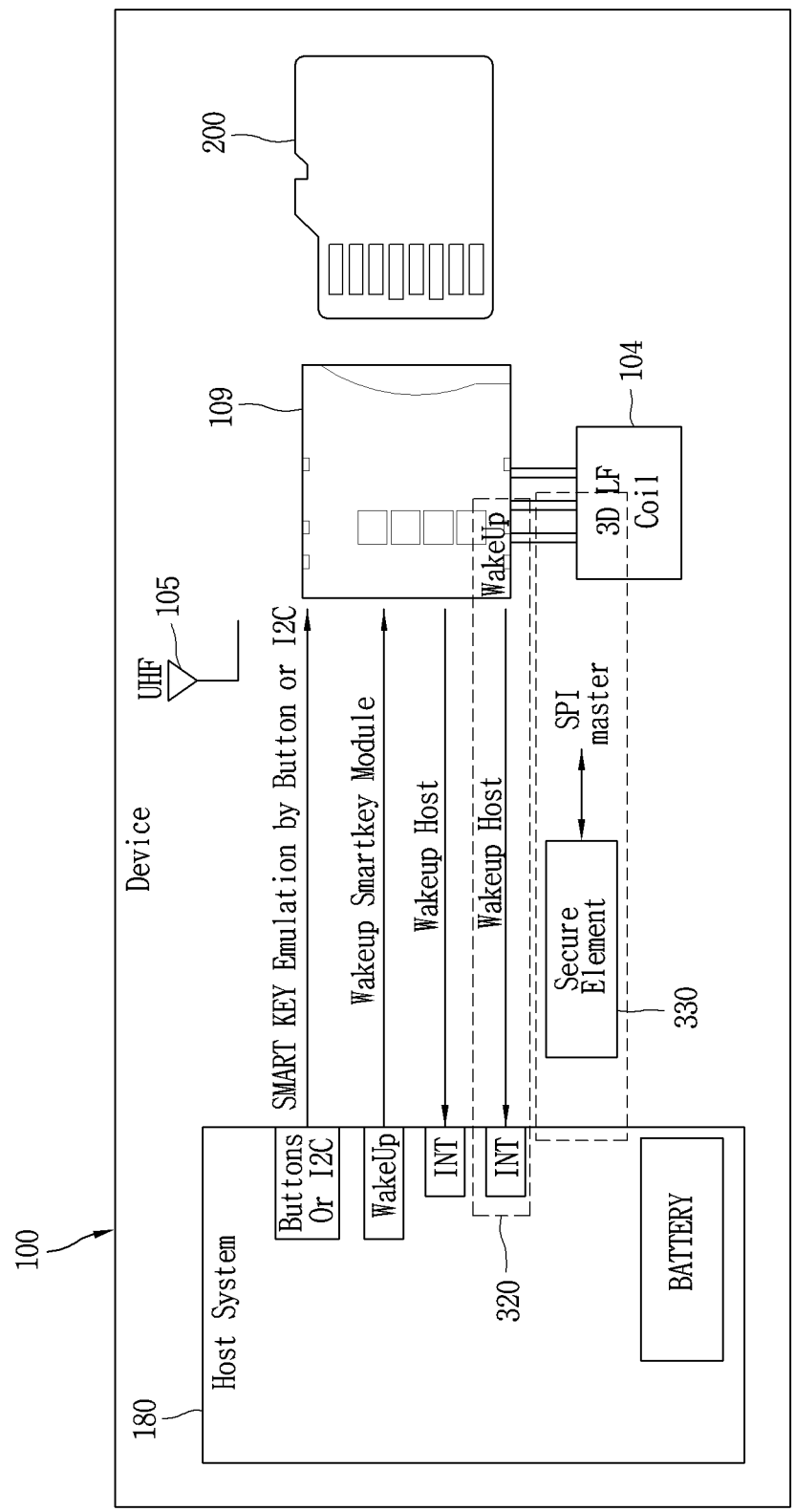
FIG. 3 is a conceptual view illustrating additional components when a card-type vehicle key module is inserted into a mobile terminal.

FIG. 3 is a conceptual view illustrating additional components when a card-type vehicle key module is inserted into a mobile terminal.

The mobile terminal 100 of the present invention may include an LF antenna 104, a UHF antenna 105, a socket 109 configured to receive a card type vehicle key module 200, and a controller 180.

The socket 109 may be included in the interface unit 160 described above.

The controller 180 may further include a step (320) of performing communication with the vehicle key module 200 when the vehicle key module 200 inserted into the socket 109.

As one example, when the vehicle key module 200 is inserted, the controller 180 (host system) receives a wake-up signal from the vehicle key module 200, and switch the mobile terminal 100 from an idle (or sleep) state to an active state in response to the reception of the wake-up signal.

In addition, when the vehicle key module 200 is inserted into the socket 109, the controller 180 may download firmware from an external server to control the vehicle associated with the vehicle key module 200. The firmware may be downloaded, for example, from the external server to the mobile terminal through link information included in vehicle-related information received in the vehicle key module 200.

The downloaded firmware may be installed or updated in the vehicle key module 200 under the control of the controller 180.

When the vehicle key module 200 is inserted into the socket 109, the vehicle key module 200 may be connected to the LF antenna 104 and the UHF antenna 105 provided in the mobile terminal 100. Various structures in which the vehicle key module 200 is connected to the LF antenna 104 and the UHF antenna 105 of the mobile terminal 100 will be described later in detail with reference to the accompanying drawings.

The socket 109 may form an inner space to accommodate the vehicle key module 200. Also, the socket 109 may be formed such that the vehicle key module 200 is inserted in a preset posture. That is, the socket 109 may be formed such that the insertion of the vehicle key module 200 is completed only when the vehicle key module 200 is inserted in the preset posture (for example, a specific surface faces a specific direction).

The socket 109 may be formed of a conductive material, or may be formed of a non-conductive material to simply form the inner space.

Meanwhile, the mobile terminal 100 of the present invention may further include a secure element 330 for preventing the vehicle key module 200 from being copied.

The secure element 330 may store firmware received from an external server or the vehicle key module 200 and/or an authentication key received from the vehicle key module 200.

Since it is specifically needed to pay attention to security of information for controlling the vehicle (firmware and authentication key (authentication information)), the controller 180 may separately store the information for controlling the vehicle in the secure element 330. For example, the secure element 330 and a single point injection (SPI) interface of the main chipset provided in the vehicle key module 200 may perform mutual communication with each other through encryption with an AES-128 bit algorithm.

In summary, the vehicle key module 200 of the present invention may be provided with pins necessary in the main chipset. For example, the pins may include pins for receiving power supplied from the mobile terminal, pins for communicating with the mobile terminal, and pins for connecting with the antenna.

The mobile terminal may include an antenna (such as an LF antenna 104 and a UHF antenna 105) for operating the vehicle key module 200, and a socket 109 formed to accommodate the vehicle key module 200.

In addition, the firmware stored (installed) in the vehicle key module 200 may be updated or changed in various ways.

For example, the firmware stored in the vehicle key module 200 may be updated or changed (erasure included) by a separate device after detaching the vehicle key module 200 from the mobile terminal 100.

As another example, the firmware stored in the vehicle key module 200 may be updated or changed by the controller 180 of the mobile terminal 100 while the vehicle key module 200 is mounted in the mobile terminal 100.

As another example, the firmware stored in the vehicle key module 200 may be updated or changed through the secure element 330 provided in the mobile terminal 100 while the vehicle key module 200 is mounted in the mobile terminal 100.

Hereinafter, a structure of the mobile terminal 100 for inserting the card-type vehicle key module 200 into the mobile terminal 100 in an optimized manner will be described in more detail with reference to the accompanying drawings.

Figure 6:
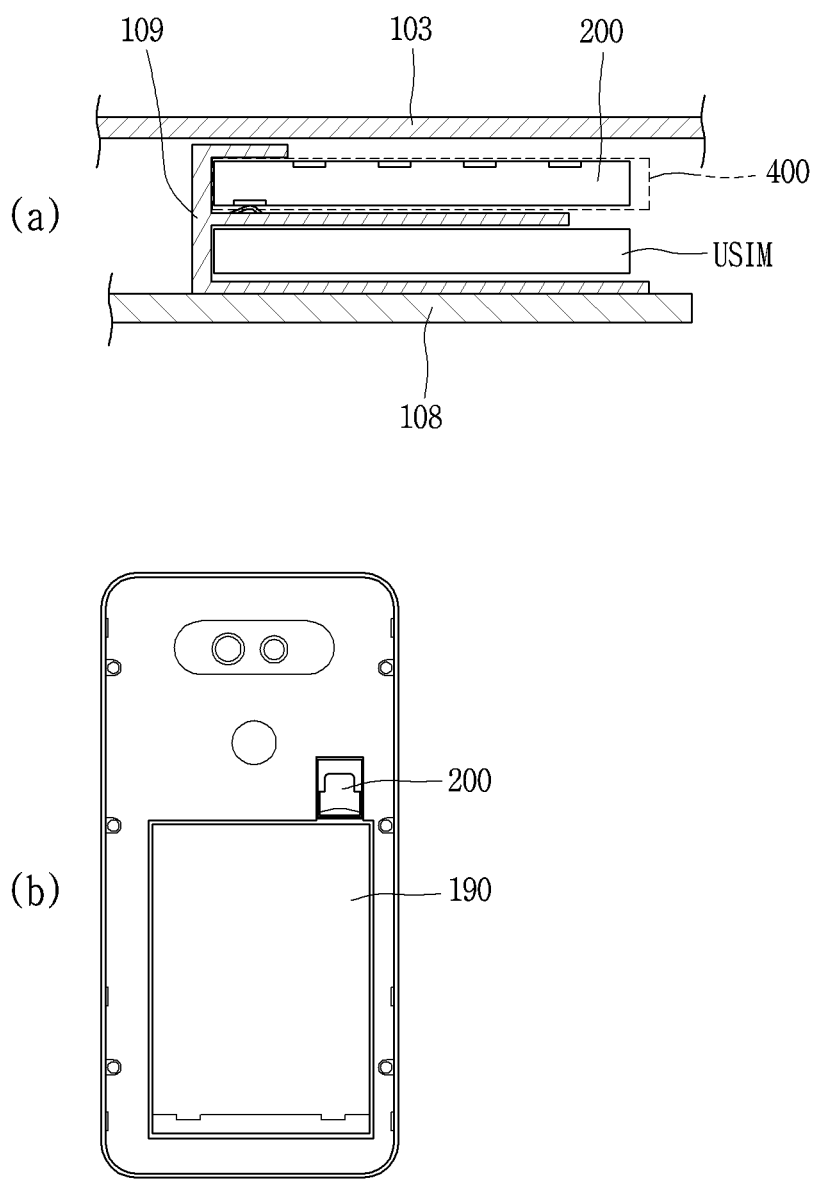
Figure 7:
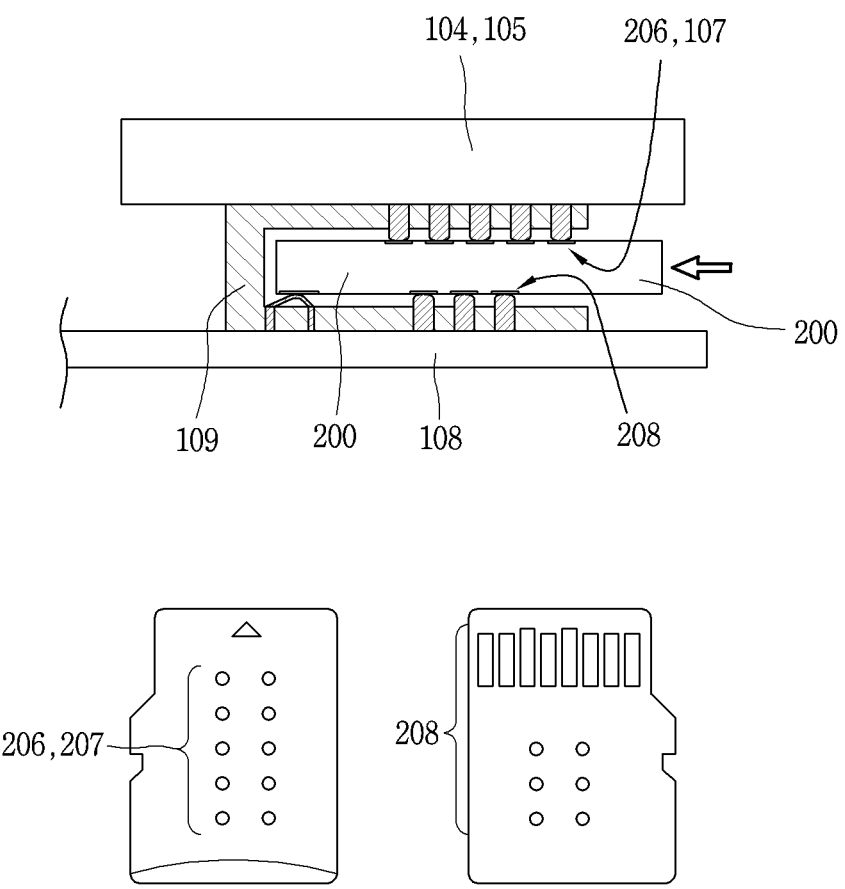
Figure 8:
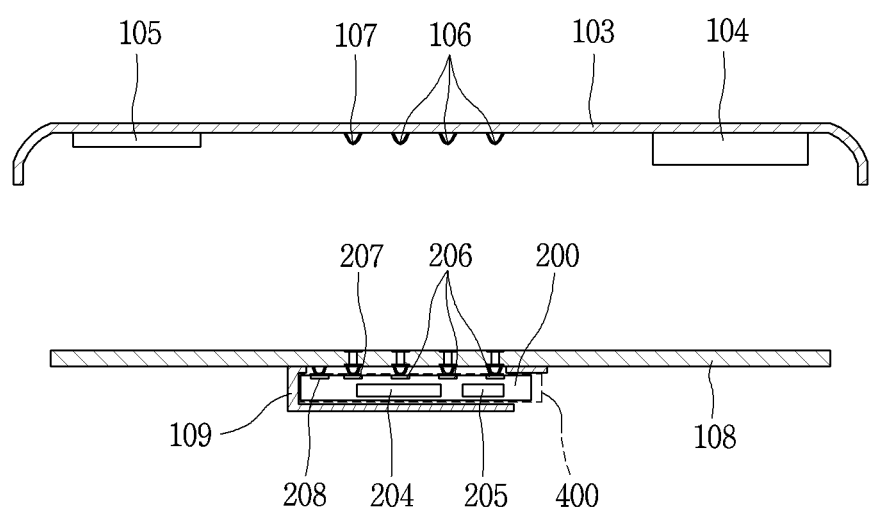
FIGS. 8, 9 and 10 are conceptual views illustrating a mobile terminal and a vehicle key module in accordance with a second embodiment of the present invention.
Figure 9:
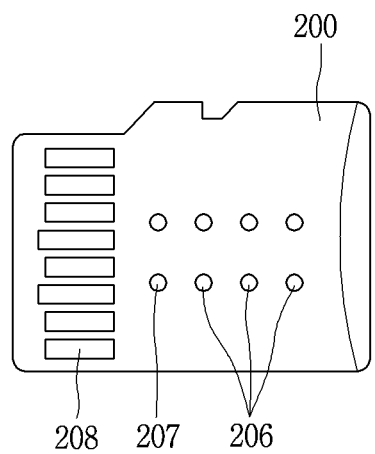
Figure 10:
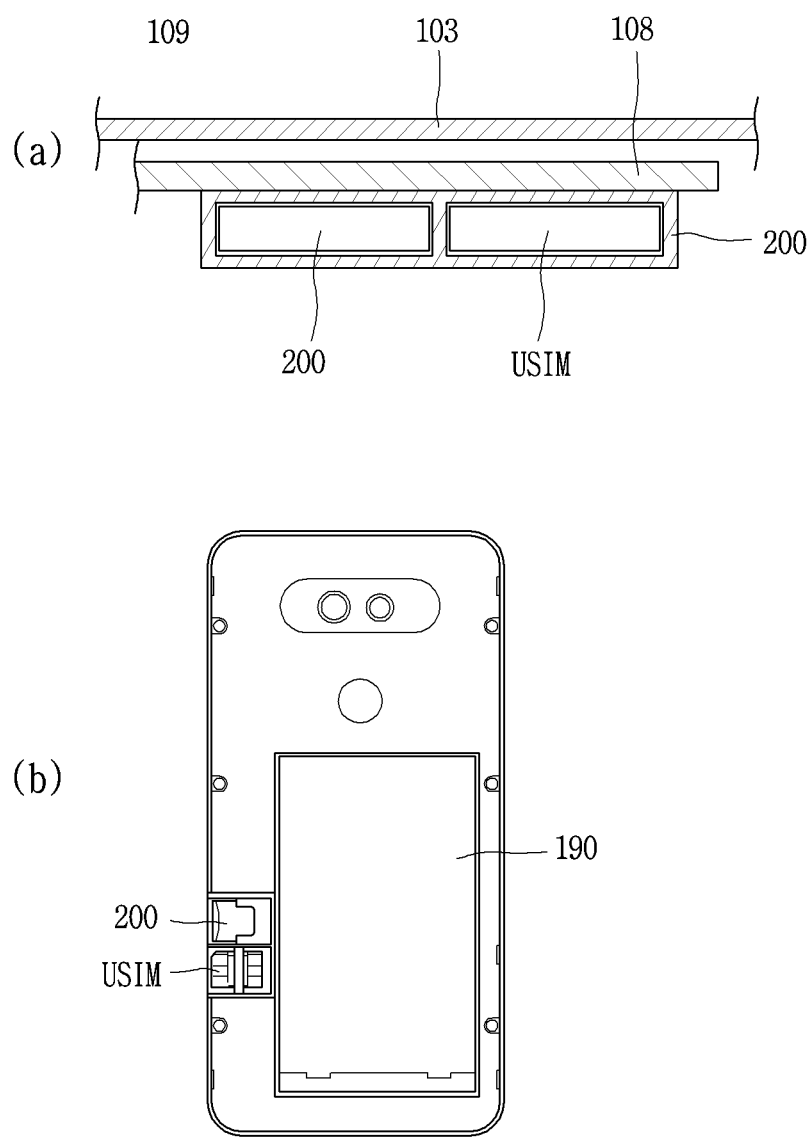

FIGS. 4, 5, 6, and 7 are conceptual views illustrating a mobile terminal and a vehicle key module in accordance with a first embodiment of the present invention, and FIGS. 8, 9, FIG. 10 are conceptual views illustrating a mobile terminal and a vehicle key module in accordance with a second embodiment of the present invention.

Figure 11:
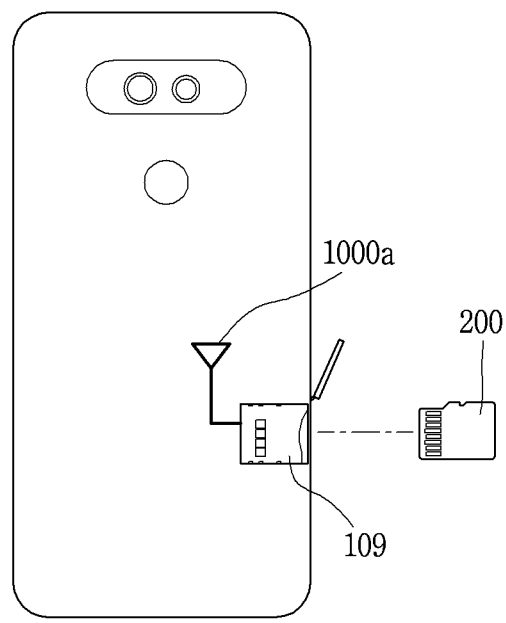
FIGS. 11 and 12 are conceptual views illustrating a mobile terminal and a vehicle key module in accordance with a third embodiment of the present invention.
Figure 12:
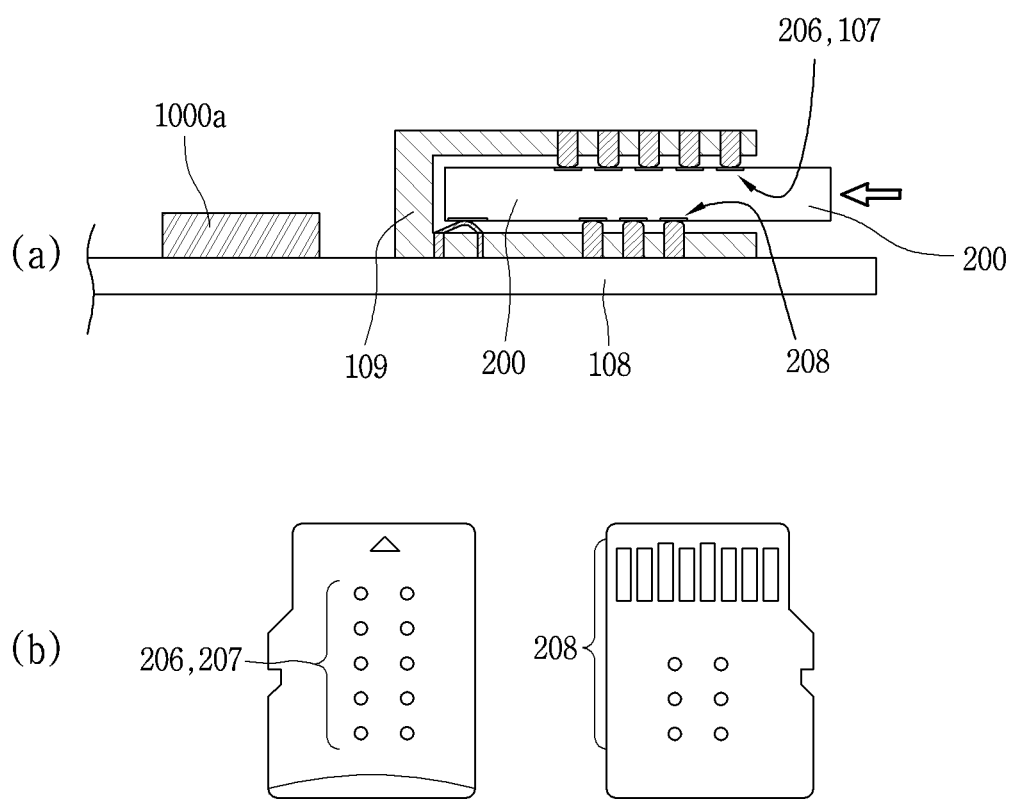
Figure 13:
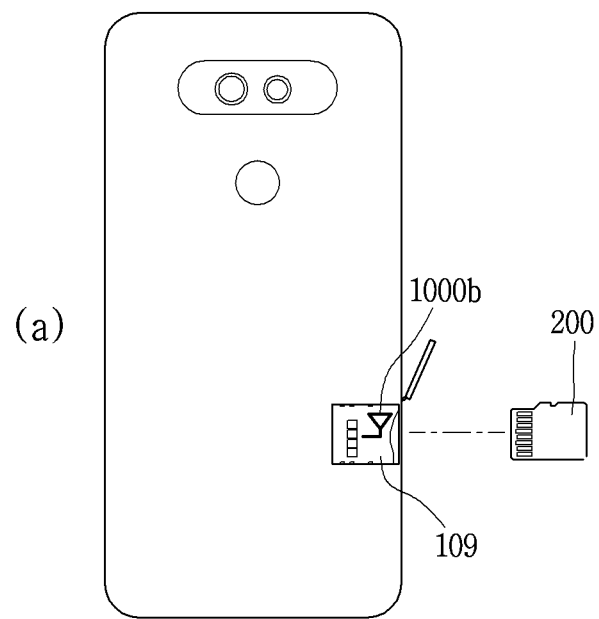
FIGS. 13 and 14 are conceptual views illustrating a mobile terminal and a vehicle key module in accordance with a fourth embodiment of the present invention.
Figure 13:
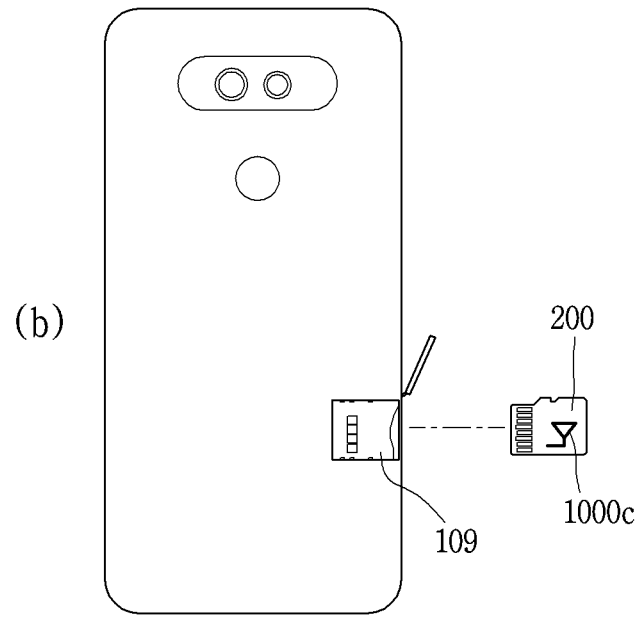
Figure 14:
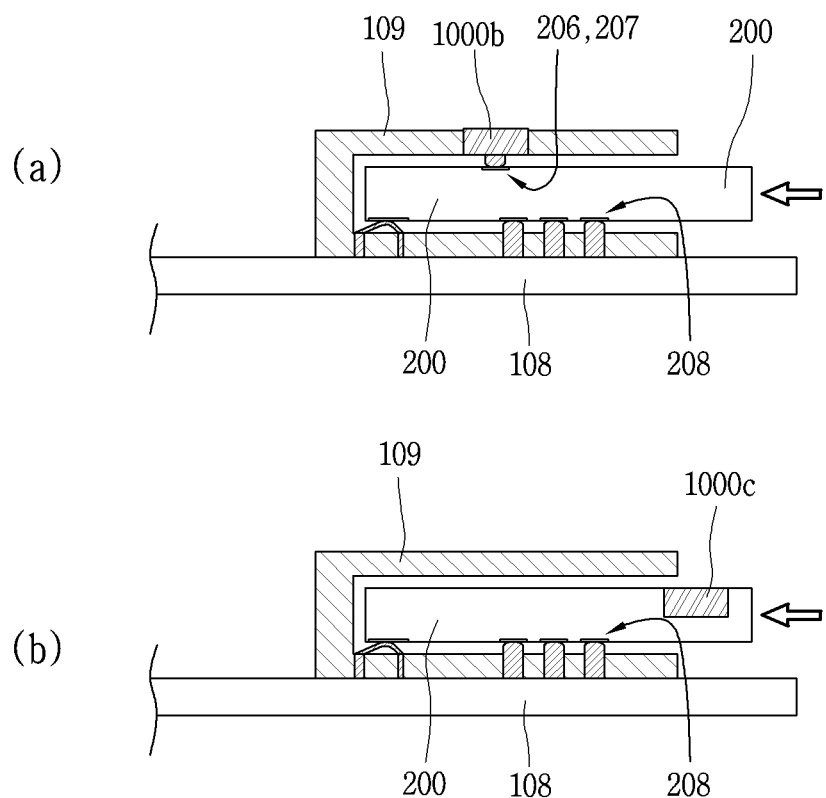

FIGS. 11 and 12 are conceptual views illustrating a mobile terminal and a vehicle key module in accordance with a third embodiment of the present invention. FIGS. 13 and 14 are conceptual views illustrating a mobile terminal and a vehicle key module in accordance with a fourth embodiment of the present invention.

First, a mobile terminal related to the present invention may include a terminal body 100. The terminal body includes a case (for example, a frame, a housing, a cover, etc.) which forms an appearance. The mobile terminal 100 may include a front case 101 and a rear case 102. Various electronic components are disposed in an inner space formed by coupling the front case 101 and the rear case 102. At least one middle case may be additionally disposed between the front case 101 and the rear case 102.

The terminal body may be provided with antennas. The antennas may be provided on the terminal body, and may include an LF antenna 104 and a UHF antenna 105.

In addition, the mobile terminal 100 of the present invention may include a socket 109 in which the vehicle key module is insertable.

A Printed Circuit Board (PCB) 108 or Printed Wiring Board (PWB) may be provided in the inner space of the terminal body 100. Various circuits may be embedded in the PCB 108, and at least one of the components described in FIG. 1A may be mounted. In addition, circuits for connecting the components described in FIG. 1A, respectively, may be disposed in the PCB 108.

The socket 109 may be coupled to the PCB 108 (or the front case 101 or the rear case 102), and formed to be detachable from the terminal body.

For example, the terminal body may include a rear cover 103. When the rear cover 103 is separated from the rear case 102, electronic components mounted on the rear case 102 are exposed to the outside.

When the rear cover 103 is formed to be detachable, the socket 109 may be formed to be detachable from the terminal body.

As another example, when the rear cover 103 is formed to be non-detachable, the socket 109 may be detachable from the terminal body. In this case, the socket may be formed to be inserted into one surface of the terminal body.

However, the present invention is not limited thereto, and even if the rear cover of the terminal body is detachable, the socket may also be detachable from the terminal body.

Meanwhile, the socket 109 may exist between the antenna and the PCB so that the inserted vehicle key module 200 is electrically connected directly to the antenna without being interfered by the PCB provided inside the terminal body.

Here, the socket 109 may accommodate the vehicle key module 200 such that the vehicle key module 200 is electrically connected directly to the antenna provided in the mobile terminal, regardless of the fact that the socket 109 is coupled to the PCB 108 (or the front case 101 or the rear case 102) or formed to be detachable from the terminal body.

That is, the socket 109 may accommodate the vehicle key module 200 in a manner that the pins provided on the accommodated vehicle key module 200 are connected directly to the antenna provided in the mobile terminal 100.

Here, the direct connection to the antenna may include the meaning that pins extending from the antenna and the vehicle key module 200 (or the pins provided on the module 200) are electrically connected directly to each other.

An inner space 400 is formed between the antenna 104 and the PCB 108 by a socket 109. The socket 109 may allow the vehicle key module 200 to be accommodated in the inner space 400.

Hereinafter, a first embodiment of the present invention will be described in more detail with reference to FIGS. 4 to 7.

Figure 4:
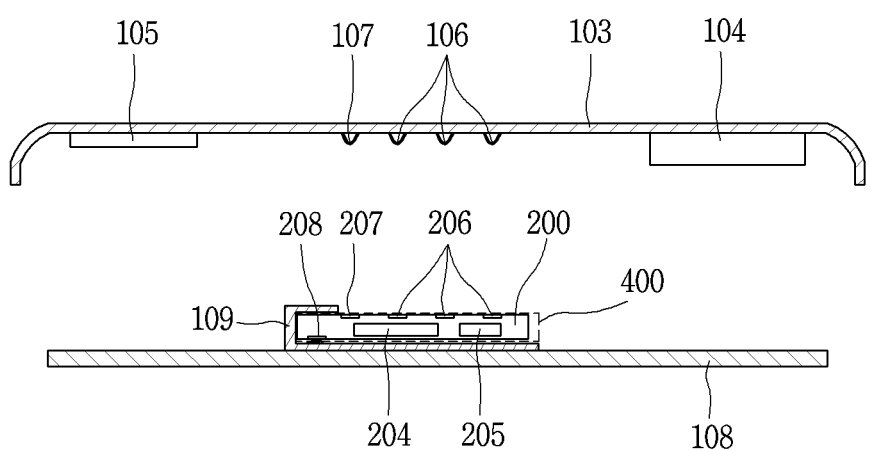
FIGS. 4, 5, 6 and 7 are conceptual views illustrating a mobile terminal and a vehicle key module in accordance with a first embodiment of the present invention.

Referring to FIG. 4, in the first embodiment, the antenna included in the mobile terminal 100 of the present invention may be embedded in the rear cover 103 of the terminal body. The antenna may include an LF antenna 104 used for the PKE function and a UHF antenna 105 used for the RKE function.

That is, the terminal body may include the detachably-coupled rear cover 103, and the antennas 104 and 105 may be embedded in the rear cover 103.

The rear cover 103 may be formed to cover the PCB 108 provided on the terminal body.

A socket 109 in which the vehicle key module 200 is insertable may be located between the rear cover 103 and the PCB 108.

The socket 109 may allow the vehicle key module 200 to be inserted therein so that the pins included in the vehicle key module 200 are directly connected to the antenna (or the pins extending from the antenna).

The rear cover 103 may be provided with an LF antenna 104, pins 106 extending from the LF antenna 104, a UHF antenna 105 and pins 107 extending from the UHF antenna 105.

Three pairs (six) of the pins 106 extending from the LF antenna 104 may be provided. Each pair may transmit a low frequency signal in an x-axis, a y-axis, and a z-axis. In this case, the LF antenna 104 may be a 3D LF antenna.

When the vehicle key module 200 is accommodated (inserted) in the internal space 400 of the socket 109, the pins 206 and 207 provided on the vehicle key module 200 may be connected directly to (or brought into contact directly with) the pins 106 extending from the LF antenna 104 and the pins 107 extending from the UHF antenna 105.

Accordingly, the vehicle key module 200 and the antenna (LF antenna 104, UHF antenna 105) can be electrically connected directly with each other without going through the PCB.

The vehicle key module 200 may be provided with first pins 206 connected to the pins 106 extending from the LF antenna 104 of the mobile terminal 100 and second pins 206 connected to the pins 107 extending from the UHF antenna 105 of the mobile terminal 100.

The first pins 206 and the second pins 207 may be provided by a number corresponding to a number of the pins 106 extending from the LF antenna 104 of the mobile terminal and the pins 107 extending from the UHF antenna 105.

The first pins 206 and the second pins 207 may be provided on the vehicle key module 200 to correspond to an embedded pattern of the pins 106 extending from the LF antenna 104 of the mobile terminal and the pins 107 extending from the UHF antenna 105.

In addition, the vehicle key module 200 may include third pins 208 connected to the PCB 108 (or pins extending from the PCB). Here, the controller 180 may perform communication with the vehicle key module 200 through the third pins 208 connected to the PCB 108.

Here, according to the first embodiment, the socket 109 is present between the rear cover 103 provided with the antennas 104 and 105 and the PCB 108. Accordingly, the vehicle key module 200 according to the first embodiment may be configured such that the first pins 206 and the second pins 207 are provided on one surface of the key module 200 (e.g., a surface facing the pins 106 and 107 extending from the antennas when the vehicle key module 200 is inserted into the socket 109).

The third pins 208 may be provided on another surface opposite to the one surface of the key module (for example, a surface facing the PCB 108 when the vehicle key module 200 is inserted into the socket 109).

That is, the first and second pins 206 and 207 and the third pins 208 may be provided on the different surfaces (opposite surfaces) of the vehicle key module 200.

In addition, the vehicle key module 200 may include a main chipset 204, and an X-Tal 205 that distinguishes a physical frequency. The main chipset 204 may perform the PKE/RKE function described above and include a PKE LF interface, a UHF transmitter, and an MCU (processor or controller).

Figure 5:
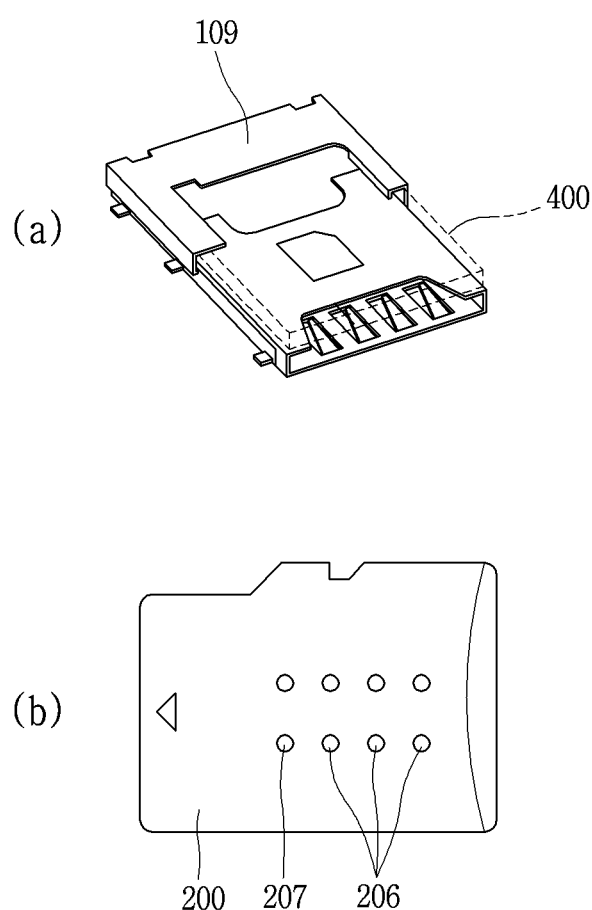

Referring to (a) of FIG. 5, the socket 109 of the present invention may form the internal space 400 into which the vehicle key module 200 is insertable.

Also, referring to (b) of FIG. 5, on one surface of the vehicle key module 200 disclosed herein may be provided the first pins 206 connected to the pins 106 extending from the LF antenna 104 of the mobile terminal 100, and the second pins 207 connected to the pins 107 extending from the UHF antenna 105 of the mobile terminal 100.

At this time, each of the first and second pins 206 and 207 may be provided in plurality, and correspond to the number and embedded pattern of the pins extending from the antennas of the mobile terminal 100.

Referring to FIG. 6, the socket 109 according to an embodiment of the present invention may be formed such that the vehicle key module 200 and a USIM card are insertable.

In this instance, referring to (a) of FIG. 6, the socket 109 may include a first space into which the vehicle key module 200 is inserted and a second space into which the USIM card is inserted. At this time, the first space and the second space may be formed to overlap each other.

For example, when the LF antenna 104 and the UHF antenna 105 of the mobile terminal are embedded in the rear cover 103 according to the first embodiment, the first space and the second space side may overlap each other such that the first space is arranged adjacent to the rear cover 103 and the second space is arranged adjacent to the PCB 108.

This is because the vehicle key module 200 accommodated in the first space is electrically connected directly to the LF antenna 104 and the UHF antenna 105 (or the pins extending therefrom) disposed in the rear cover 103.

As another example, as illustrated in (a) of FIG. 10, the socket 109 may be formed such that the vehicle key module 200 and the USIM card overlap different areas of the terminal body, respectively. The socket 109 may be formed so that the vehicle key module 200 and the USIM card are inserted into the mobile terminal 100 side by side without overlapping each other.

Figure 15:
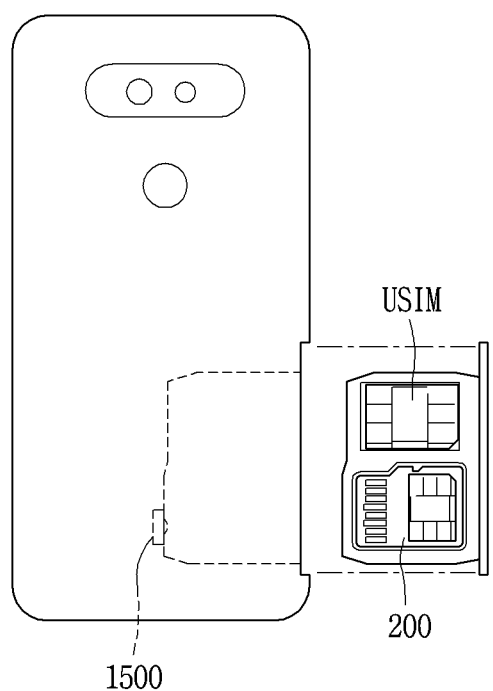
FIG. 15 is a conceptual view illustrating a method of using a vehicle key module mounted in a mobile terminal in accordance with one embodiment of the present invention.

In other words, as illustrated in FIG. 15, the socket 109 may be formed such that the vehicle key module 200 and the USIM card are inserted to be fully exposed when viewed from one direction after the socket 109 is separated from the terminal body in a state in which the vehicle key module 200 and the USIM card are mounted.

On the other hand, as illustrated in (b) of FIG. 6, the socket 109 may be disposed so as not to overlap the battery (power supply unit) 190 of the mobile terminal.

Referring to (a) of FIG. 7, the mobile terminal 100 according to the first embodiment may be configured such that the socket 109 is located between the antennas 104 and 105 disposed on the rear cover and the PCB 108.

The vehicle key module 200 may be inserted into the socket 109, and the pins 106 and 107 extending from the antennas 104 and 105 provided in the rear cover and the pins extending from the PCB 108 may penetrate through the socket 109.

As illustrated in (b) of FIG. 7, the vehicle key module 200 may be provided with various pins for contacting the pins.

On one surface of the vehicle key module 200 may be provided the first pins 206 connected to the pins 106 extending from the LF antenna 104 and the second pins connected to the pins 107 extending from the UHF antenna 105.

The third pins 208 connected to the pins 108 extending from the PCB 108 may be provided on the other surface of the vehicle key module 200.

The first pins 206 and the second pins 207 provided on the one surface of the vehicle key module 200 may play a role of inputting and outputting a low frequency signal and a high frequency signal for performing the PKE function or the RKE function, inputting and outputting a signal for performing an immobilizer function, or shielding (or grounding) a high frequency signal.

For example, the vehicle key module 200 may input/output a low-frequency signal of x-axis, y-axis, or z-axis through the first pins 206 and input/output a signal for performing the immobilizer function.

Further, the vehicle key module 200 may input/output a high frequency signal and shield (or ground) the high frequency signal through the second pins 207.

The third pins 208 provided on the another surface of the vehicle key module 200 may perform communication with the controller 180 of the mobile terminal 100.

For example, the vehicle key module 200 may receive power from the power supply unit of the mobile terminal 100 through the third pins 208, download a control clock, control data and software (firmware), and input/output or ground an interrupt signal for minimizing consumed currents.

As described above, the present invention can omit circuits installed for connecting the vehicle key module to the antennas through the PCB, in the manner of electrically connecting the pins provided on the vehicle key module directly to the antennas provided in the mobile terminal when the vehicle key module is inserted in the card form into the mobile terminal.

That is, the present invention can minimize a mounting area of the PCB by directly connecting the vehicle key module to the antennas of the mobile terminal, and also optimize an antenna performance by shortening a length of the circuit connected up to the antenna.

Meanwhile, the present invention may provide the structure for inserting the vehicle key module 200 into the mobile terminal in more various ways.

FIGS. 8 to 10 are conceptual views illustrating a mobile terminal and a vehicle key module according to a second embodiment of the present invention.

As illustrated in FIG. 8, the mobile terminal according to the second embodiment may be configured so that the PCB is in contact with the antennas (LF antenna 104 and UHF antenna 105) provided in the mobile terminal.

At this time, the socket 109 accommodating the vehicle key module 200 may accommodate the vehicle key module 200 so that the inserted vehicle key module 200 is brought into contact with the antennas through the PCB 108.

Specifically, in the second embodiment, the socket 109 is not provided to between an antenna-attached portion and the PCB 108, but may be provided on a surface opposite to a surface where the PCB and the antennas are in contact with each other.

For example, in the second embodiment, the antennas may be embedded in the rear cover 103 of the terminal body.

At this time, the rear cover 103 may be provided with the LF antenna 104, the pins 106 extending from the LF antenna 104, the UHF antenna 105, and the pins 107 extending from the UHF antenna 105.

In one surface of the PCB 108 may be provided connection pins which are formed to contact the pins 106 and 107 extending from the antennas.

The connection pins may extend up to another surface of the PCB 108.

The socket 109 may be disposed on the another surface of the PCB 108 or may be formed to be inserted into the another surface of the PCB 108.

The socket 109 may accommodate (insert) the vehicle key module 200 therein such that the pins provided on the vehicle key module 200 are brought into contact with the connection pins extending up to the another surface of the PCB.

The pins provided on the vehicle key module 200 inserted into the socket 109 may be electrically connected to the connection pins extending up to the another surface of the substrate.

In this case, the vehicle key module 200 inserted into the inner space 400 of the socket 109 may be electrically connected to the mobile terminal 100 through the PCB 108.

That is, fourth fins are provided on the one surface of the PCB 108 to be connected to the pins 106 and 107 extending from the antennas 104 and 105 provided on the rear cover 103, and fifth pins may be provided on the another surface of the PCB 108 to be connected to the pins of the vehicle key module 200 inserted into the socket 109. The fourth pins and the fifth pins may be electrically connected.

The connection pins described above may include the fourth pins and the fifth pins.

As described above, the vehicle key module 200 may include the first pins 206 connected to the pins extending from the LF antenna, the second pins 207 connected to the pins extending from the UHF antenna, and the third pins 208 connected thereto.

In the vehicle key module 200 according to the second embodiment, as illustrated in FIGS. 8 and 9, the first to third pins 206, 207, 208 may all be provided on one surface of the vehicle key module 200.

The first pins 206 of the vehicle key module 200 may be connected to the pins 106 extending from the LF antenna 104 disposed in the rear cover 103 through the fifth pins and the fourth pins provided on the PCB 108.

The second pins 207 of the vehicle key module 200 may be electrically connected to the pins 107 extending from the UHF antenna disposed in the rear cover 103 through the fifth pins and the fourth pins provided on the PCB 108.

The roles of the first to third pins are the same/like to those described above.

As illustrated in (a) of FIG. 10, the mobile terminal 100 of the present invention may include the rear cover 103 having the antennas 104 and 105 therein, the PCB 108, and the socket accommodating the vehicle key module 200 in a sequential manner. That is, the rear cover 103 may be connected to one surface of the PCB 108, and the socket 109 may be coupled to (or inserted into) another surface of the PCB 108.

In addition, the socket 109 of the mobile terminal 100 of the present invention may be formed such that the vehicle key module 200 and a USIM card are insertable.

At this time, as illustrated in (b) of FIG. FIG. 10, the socket may be formed such that the vehicle key module and the USIM card overlap different areas of the terminal body, respectively.

With no limit to this, the socket may be formed so that a first space in which the vehicle key module is inserted and a second space in which the USIM card is inserted overlap each other.

At this time, the overlap may be made in a front to rear direction.

In addition, the socket 109 may be disposed at a position that does not overlap the battery 190 in the front to rear direction. This is to prevent communication performance of the antenna from being deteriorated by the battery.

In addition, the mobile terminal of the present invention may further provide various structures for coupling the vehicle key module and the antennas of the mobile terminal.

FIGS. 11 and 12 are conceptual views illustrating a mobile terminal and a vehicle key module according to a third embodiment of the present invention. FIGS. 13 and 14 are conceptual views illustrating a mobile terminal and a vehicle key module according to a fourth embodiment of the present invention.

Referring to FIG. 11, an antenna 1000a of the mobile terminal 100 according to the third embodiment may be provided on the PCB 108. As another example, the antenna 1000a may also be provided in the front case 101 or the rear case 102. The antenna 1000a may include the LF antenna 104 and the UHF antenna 105 described above.

The socket 109 according to the third embodiment may be formed such that the inserted vehicle key module is connected to the antenna provided on the PCB.

Referring to FIG. 12, the socket 109 may be formed so that the inserted vehicle key module 200 is connected to the antenna 1000a through the PCB.

The socket 109 may be provided with pins 206 and 207 extending from the antenna 1000a provided on the PCB 108 and connected to the pins of the vehicle key module 200 through the socket 109.

Accordingly, when the vehicle key module 200 is inserted into the socket 109, the inserted vehicle key module 200 may be electrically connected to the antenna 1000a through the PCB 108.

In this instance, the vehicle key module 200 may be the same/like to the structure and operation described in the first embodiment.

Referring to (a) of FIG. 13, an antenna 1000b of the present invention may be provided in the socket 109.

In this case, the socket 109 may be formed so that the inserted vehicle key module 200 is electrically connected directly to the antenna provided in the socket 109.

Referring to (b) of FIG. 13, an antenna 1000c of the present invention may be embedded in the vehicle key module 200.

In this case, when the vehicle key module having the antenna 1000c is inserted into the socket 109, the controller 180 may perform communication with the vehicle (or control the vehicle) using the antenna provided in the vehicle key module 200.

Each of the antennas 1000b and 1000c may include the LF antenna 104 and the UHF antenna 105 described above.

As illustrated in (a) of FIG. 14, when the antenna 1000b is provided in the socket 109, a number of the first pins and the second pins provided on the vehicle key module 200 may be smaller than that illustrated in the foregoing first to third embodiments.

Also, as illustrated in (b) of FIG. 14, when the antenna 1000c is embedded in the vehicle key module 200, the first pins and the second pins may not be provided on the vehicle key module 200.

As illustrated in (a) and (b) of FIG. 14, the third pins 208 formed to be connected to the PCB will be understood with reference to the foregoing description.

FIG. 15 is a conceptual view illustrating a method of using a vehicle key module mounted in a mobile terminal according to one embodiment of the present invention.

A USIM card for mobile communication may be inserted into the socket 109 provided in the mobile terminal 100 of the present invention. In addition, an SD card (memory card) may be also inserted into the socket 109.

On the other hand, according to the present invention, two cards may be inserted into the socket 109. When it is assumed that the USIM card is essentially inserted, whether the other card is the SD card or the vehicle key module 200 may be identified.

For example, the controller 180 of the mobile terminal 100 of the present invention may identify (determine) a type of an inserted card based on a resistance value of the pin provided on the inserted card (or vehicle key module) or a current value measured using the resistance value.

For example, when a card is inserted, the controller 180 may measure a current value by transmitting a current to the pin provided on the inserted card. At this time, the controller 180 may recognize the inserted card as the SD card when the measured current value is a first value, while recognizing the inserted card as the vehicle key module when the measured current value is a second value different from the first value. The first value and the second value may be decided according to a type of each card or may be changed depending on a user's setting.

The mobile terminal 100 may further include a switching unit 1500 for switching an operation mode according to a type of an inserted card. The switching unit may be included in the controller 180, may be a separate physical component, or may be a software program.

When the inserted card is the SD card, the switching unit 1500 may request the controller 180 to perform a first function linked with the SD card.

When the inserted card is the vehicle key module 200, the switching unit 1500 may request the controller 180 to perform a second function linked with the vehicle key module 200.

On the contrary, the controller 180 may control the switching unit 1500 to execute the first function when the inserted card is identified as the SD card, 1500 and control the switching unit 1500 to execute the second function when the inserted card is identified as the vehicle key module 200.

As described above, the present invention can implement the vehicle key module as a card type which is insertable into the mobile terminal, and provide the structure capable of connecting the card-type vehicle key module to the antenna of the mobile terminal in an optimized manner.

Hereinafter, various methods for controlling a vehicle using a mobile terminal when a card-type vehicle key module is coupled to the mobile terminal will be described in detail with reference to the accompanying drawings.

FIGS. 16, 17, 18, 19, and 20 are flowcharts illustrating various control methods when a vehicle key module is mounted in a mobile terminal according to one embodiment of the present invention.

Figure 16:
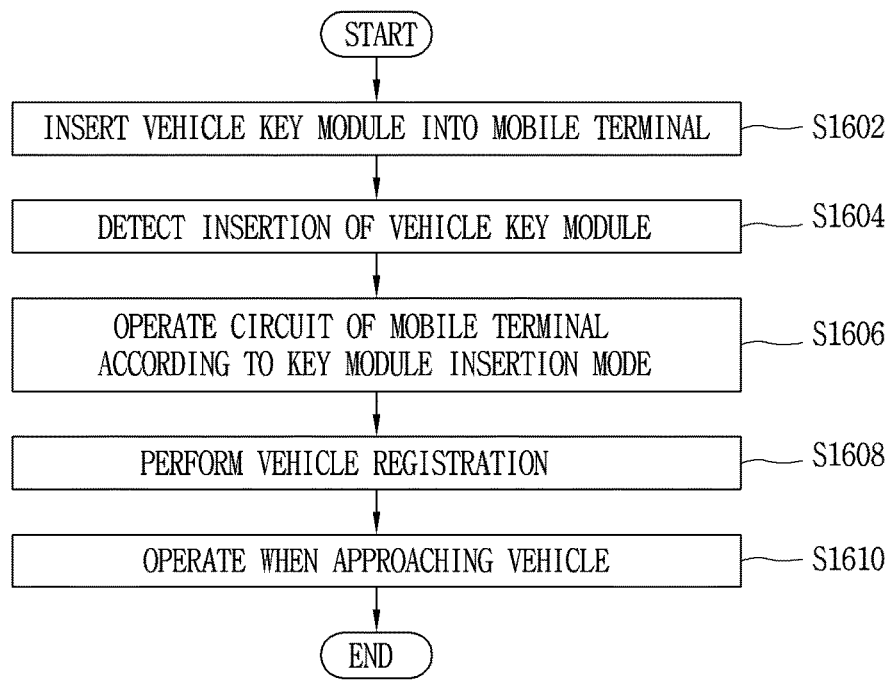
FIGS. 16, 17, 18, 19 and 20 are flowcharts illustrating various control methods when a vehicle key module is mounted in a mobile terminal in accordance with one embodiment of the present invention.

FIG. 16 is a flowchart illustrating a method of controlling the mobile terminal when the vehicle key module is inserted.

Referring to FIG. 16, first, the vehicle key module 200 is inserted into the mobile terminal 100 (S1602). The vehicle key module 200 may be formed in the card form as described above, and may be inserted into the socket of the mobile terminal 100.

The structure in which the vehicle key module 200 is inserted into the mobile terminal 100 and the structure in which the vehicle key module 200 and the antennas 104 and 105 of the mobile terminal 100 are electrically connected have been described above.

Afterwards, the controller 180 may detect whether the vehicle key module is inserted (S1604). Specifically, when the card is inserted into the socket of the mobile terminal, the controller 180 may decide whether the inserted card is an SD card or the vehicle key module 200. The related contents will be understood with reference to the description of FIG. 15.

Thereafter, when the controller 180 detects that the vehicle key module 200 is inserted, the controller 180 may enter a mode in which the vehicle key module 200 can operate.

For example, when it is determined that the inserted card is the vehicle key module 200, the controller 180 may control the switching unit 1500 described with reference to FIG. 15 to enter a mode for performing communication with the vehicle key module 200.

The controller 180 may then register the vehicle that can be controlled by the inserted vehicle key module 200 (S1608).

For example, when the inserted vehicle key module 200 is initially inserted into the mobile terminal 100, the vehicle and the vehicle key module may be registered through an OTA server. At this time, information related to the vehicle key module 200 may be transmitted to the OTA server through a communication unit (antenna) of the mobile terminal.

For example, the mobile terminal 100 may register in the OTA server an authentication key of the vehicle key module 200 and a unique number of the vehicle that can be controlled by the vehicle key module 200.

Thereafter, when approval information is received from the OTA server, the vehicle may be controllable by the mobile terminal 100 in which the vehicle key module 200 is inserted.

When the mobile terminal 100 in which the vehicle key module 200 is inserted approaches the vehicle after the registration of the vehicle and the vehicle key module, the controller 180 of the mobile terminal 100 may wake up and activate the vehicle key module 200 based on a low frequency signal from the vehicle (S1610).

Here, when an unlock button provided on a vehicle door is pressed by the user (or when a handle is pulled to open the vehicle door), the vehicle may transmit the low frequency signal through the LF antenna provided at a portion where a user operation is performed.

The controller of the mobile terminal 100 may receive the low frequency signal and transmit the low frequency signal to the inserted vehicle key module 200. When a response signal transmission request is received from the vehicle key module 200, the controller of the mobile terminal 100 may transmit a high frequency signal through the UHF antenna of the mobile terminal.

The vehicle may perform a vehicle control corresponding to the user operation based on the received high frequency signal.

The above operation may be one operation of the PKE function performed while the vehicle key module 200 is inserted into the mobile terminal.

As the RKE function performed while the vehicle key module 200 is inserted into the mobile terminal, when a driver having the mobile terminal with the vehicle key module inserted approaches the vehicle within a predetermined distance, the controller 180 of the mobile terminal may transmit a vehicle door unlock control command to the vehicle remotely in a form of a high frequency signal based on the approach.

Figure 17:
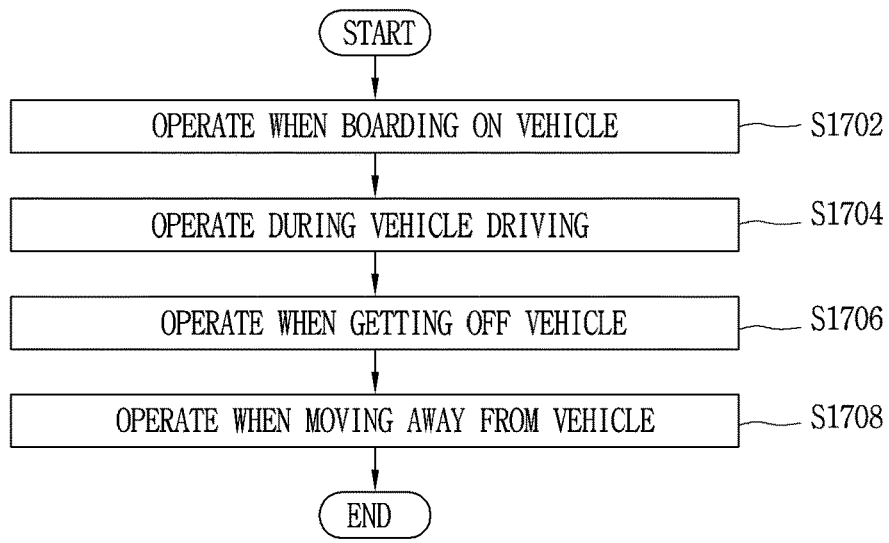

FIG. 17 is a flowchart illustrating another method for controlling the mobile terminal when the vehicle key module is inserted.

First, when a driver having the mobile terminal 100 in which the vehicle key module 200 is inserted is boarded on the vehicle, the controller 180 may enter a separate vehicle control mode based on the boarding on the vehicle (S1702). At this time, the controller 180 may receive a control command for controlling the mobile terminal through a voice recognition.

Afterwards, when it is detected that the vehicle is driven (S1704), the controller 180 may operate the camera 121. Then, the controller 180 may determine a forward situation of the vehicle based on an image received through a camera while the vehicle is driven, and output information related to the driving on the display unit 151.

For example, in order to prevent a vehicle accident, the controller 180 may perform lane recognition, distance to a front vehicle, traffic light recognition, vehicle speed control recognition, pedestrian recognition, and the like based on the image received through the camera, and output a warning message to the user.

In addition, the controller 180 may store driving information, which is sensed during driving using the GPS and sensor information, in a memory.

Afterwards, when it is detected that the driver having the mobile terminal 100 with the vehicle key module 200 inserted is getting off the vehicle (S1706), the controller 180 may store current location information, and provide the stored location information based on a user request. Accordingly, the present invention can provide a user interface that enables the user to more easily grasp the latest location of the vehicle later.

When the mobile terminal 100 in which the vehicle key module 200 is inserted is moved away from the vehicle by a predetermined distance (S1708), the controller may then transmit a vehicle door lock or an engine off control command to the vehicle in a form of a high frequency signal. This operation may be understood as one operation of the RKE function.

The controller 180 may detect whether the mobile terminal 100 is moving away from the vehicle by a predetermined distance or more based on a non-reception of the low frequency signal transmitted from the vehicle or a distance between the mobile terminal and the vehicle sensed through the sensing unit 160.

Figure 18:
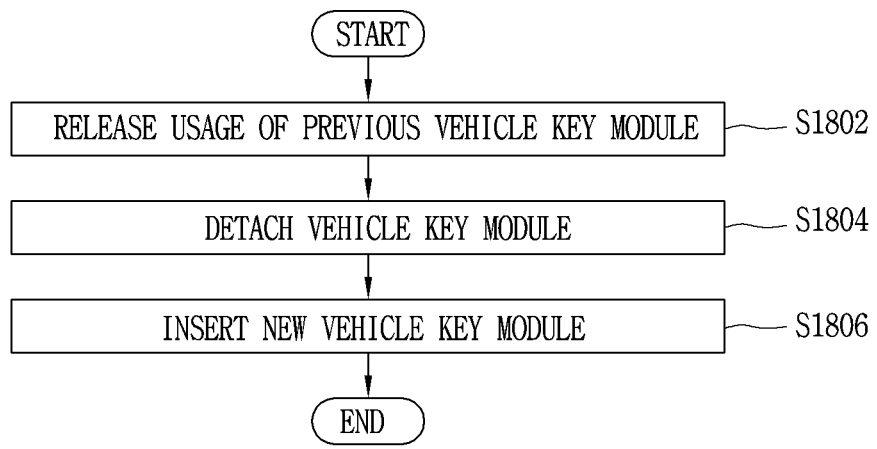

FIG. 18 is a flowchart illustrating another method of controlling the mobile terminal when a vehicle key module is replaced.

First, when a vehicle is changed, it may happen that a vehicle key module that matches the vehicle is exchanged. In this case, a process of releasing a use of a previously-inserted vehicle key module may be performed (S1802).

At this time, the controller 180 may release a usage right for the previously-inserted vehicle key module via an OTA server.

Thereafter, when the usage right is released, the user may remove the previous vehicle key module from the mobile terminal and insert a new vehicle key module into the mobile terminal (S1806).

In this case, the controller 180 may register a new vehicle key module and a new vehicle controlled by the vehicle key module via the OTA server. This registration process may be applied to the above-described step S1608 in the same/like manner.

Figure 19:
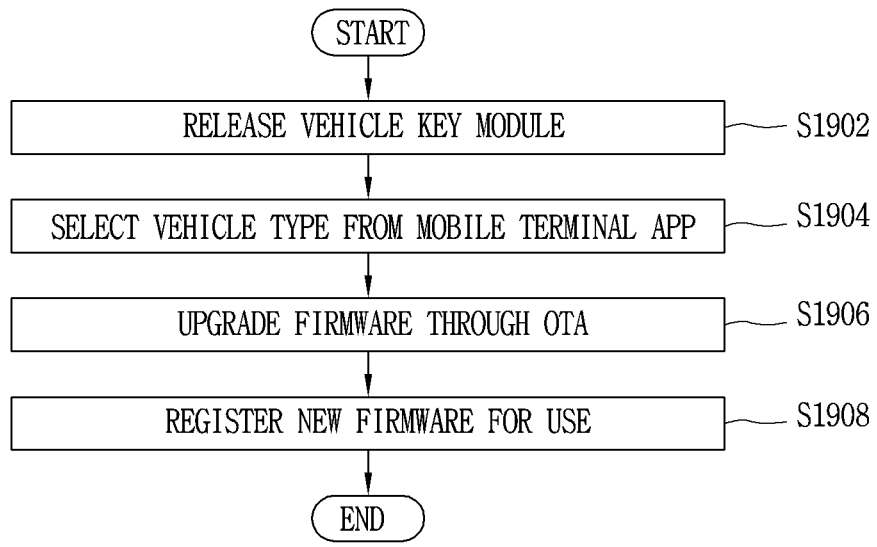

FIG. 19 is a flowchart illustrating a method for controlling a changed vehicle using a vehicle key module previously inserted into a mobile terminal, without replacing the previously-inserted vehicle key module, when the vehicle is changed.

First, when the vehicle is changed but the vehicle key module inserted in the mobile terminal is the same, the changed vehicle may be controlled by changing only firmware without replacing the module.

At this time, when it is desired to change a vehicle to be controlled (or a new vehicle is purchased), a control authority of the existing vehicle key module may be released (S1902). The controller 180 may release the control authority of the existing vehicle key module through the OTA server or through a user menu, in response to a user request.

Thereafter, the controller 180 may select a type of the changed vehicle through the mobile terminal based on a user request (S1904). At this time, the controller 180 may receive vehicle information related to a country, a manufacturer, and the like as well as the type.

Based on the information reception, the controller 180 may request the OTA server to change firmware through the communication unit.

The controller 180 may receive the firmware from the OTA server and change the received firmware to a vehicle key module via an interface (pin) where the PCB and the vehicle key module are brought in contact with each other.

At this time, for security, the controller 180 may encrypt the firmware, store the encrypted firmware in the secure element 330, and change (update) the firmware of the vehicle key module 200 through the secure element 330.

When the firmware of the vehicle key module 200 is changed, the controller 180 may register the changed vehicle and the vehicle key module 200 in the OTA server. The registration process may be applied to the step S1608 described above in the same/like manner.

Figure 20:
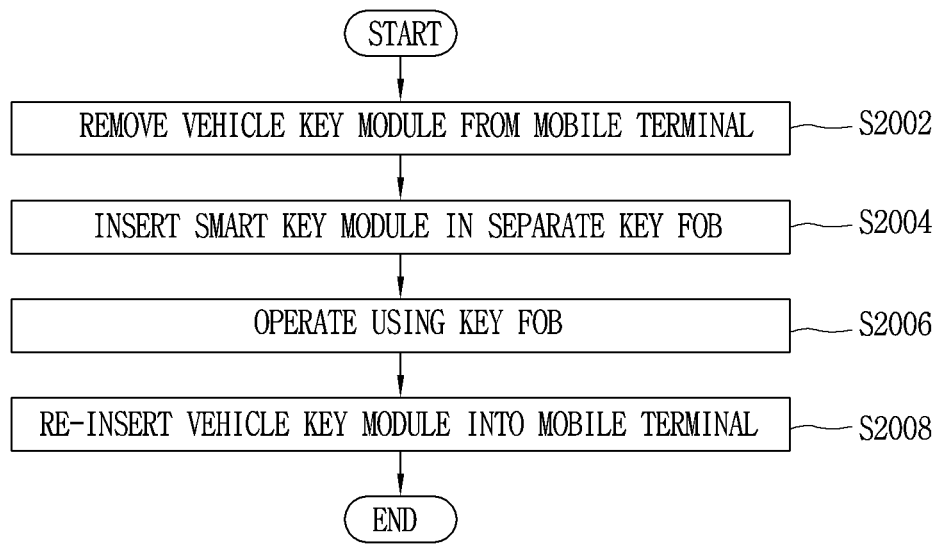

FIG. 20 is a flowchart illustrating a method of inserting a vehicle key module into a separate key fob for use.

The card-type vehicle key module according to the present invention may control the vehicle by being inserted into a key fob such as the related art smart key.

This may be applied when leasing the vehicle key module to another person or a third party for valet parking.

To this end, the vehicle key module is removed from the mobile terminal (S2002).

Thereafter, the removed vehicle key module is inserted into the key fob (S2004).

The key fob may preferably be provided with an LF antenna, a UHF antenna battery, a physical key, and a finger scan module. In this case, when the vehicle key module is inserted into the key fob, the same/like operation as inserting the vehicle key module into the mobile terminal may be performed.

A control authority for controlling the vehicle may depend on whether the vehicle key module 200 is inserted into the mobile terminal or into the key fob. Such control authority may be decided by a processor provided in the vehicle key module.

For example, the processor may grant a first control authority to the mobile terminal, or operate with the first control authority when it is determined that the vehicle key module is inserted in the mobile terminal.

As another example, when the processor may grant a second control authority less than the first control authority to the mobile terminal or operate with the second control authority when it is determined that the vehicle key module is inserted into the key fob.

When the vehicle key module is inserted into the key fob, the vehicle may be controlled through the key fob (S2006). For example, when the vehicle key module is inserted into a key fob without being inserted into the mobile terminal, a general smart key operation may be performed.

At this time, for security, the vehicle may be controlled by the key fob with the vehicle key module inserted therein only when the user is an authorized user using the finger scan module provided in the key fob.

Thereafter, when the vehicle key module is detached from the key fob and reinserted into a mobile terminal (S2008), if the mobile terminal is a previously registered mobile terminal, the mobile terminal may perform a function of controlling the vehicle without a separate registration procedure.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a terminal body;
   an antenna provided in the terminal body; and
   a socket formed such that a vehicle key module is insertable,
   wherein the socket is located between the antenna and a printed circuit board (PCB) provided in the terminal body, such that the inserted vehicle key module is electrically connected directly to the antenna without passing through the printed circuit board.

2. The terminal of claim 1, wherein the socket accommodates the vehicle key module such that pins provided on the vehicle key module are directly connected to the antenna.

3. The terminal of claim 1, wherein the socket forms an inner space between the antenna and the printed circuit board, and
wherein the socket accommodates the vehicle key module in the inner space.

4. The terminal of claim 1, wherein the terminal body is provided with a rear cover detachably coupled thereto, and
wherein the antenna is embedded in the rear cover.

5. The terminal of claim 4, wherein the rear cover is provided with antenna pins extending from the antenna, and
wherein the antenna pins are directly connected to the pins of the vehicle key module inserted into the socket.

6. The terminal of claim 5, wherein the antenna includes a low frequency (LF) antenna and an ultra high frequency (UHF) antenna.

7. The terminal of claim 6, wherein the vehicle key module comprises:
first pins connected to pins extending from the low frequency antenna;
second pins connected to pins extending from the ultra high frequency antenna; and
third pins connected to the printed circuit board.

8. The terminal of claim 7, wherein the first pins and the second pins are provided on one surface of the vehicle key module, and
wherein the third pins are provided on another surface opposite to the one surface of the vehicle key module.

9. The terminal of claim 1, wherein the socket is coupled to the printed circuit board.

10. The terminal of claim 1, wherein the socket is formed to be detachable from the terminal body.

11. The terminal of claim 1, wherein the socket is formed such that the vehicle key module and a universal subscriber identity module (USIM) card are insertable.

12. The terminal of claim 10, wherein the socket includes a first space in which the vehicle key module inserted, and a second space in which the USIM card is inserted, and the first space and the second space overlap each other.

13. The terminal of claim 11, wherein the socket is formed such that the vehicle key module and the USIM card overlap different areas of the terminal body, respectively.

14. The terminal of claim 1, wherein the printed circuit board is brought into contact with the antenna, and
wherein the socket accommodates the vehicle key module such that the inserted vehicle key module is brought into contact with the antenna through the printed circuit board.

15. The terminal of claim 14, wherein the terminal body is provided with a rear cover detachably coupled thereto, and
wherein the antenna is embedded in the rear cover.

16. The terminal of claim 15, wherein the antenna provided in the rear cover is brought into contact with one surface of the printed circuit board, and
wherein the socket is provided on another surface of the printed circuit board.

17. The terminal of claim 16, wherein on the one surface of the printed circuit board are provided fourth pins connected to the pins extending from the antenna, and
wherein on the another surface of the printed circuit board are provided with fifth pins connected to the pins of the vehicle key module.

18. The terminal of claim 17, wherein the antenna includes a low frequency (LF) antenna and an ultra high frequency (UHF) antenna,
wherein the vehicle key module comprises:
first pins connected to pins extending from the low frequency antenna;
second pins connected to pins extending from the ultra high frequency antenna; and
third pins connected to the printed circuit board, and
wherein the first to third pins are all arranged on one surface of the vehicle key module.

19. The terminal of claim 1, wherein the antenna is provided in the printed circuit board, and
wherein the socket is formed such that the inserted vehicle key module is connected to the antenna provided in the printed circuit board.

20. The terminal of claim 19, wherein the socket is formed such that the inserted vehicle key module is connected to the antenna through the printed circuit board.

21. The terminal of claim 1, wherein the antenna is provided in the socket, and
wherein the socket is formed such that the inserted vehicle key module is directly connected to the antenna provided in the socket.

22. The terminal of claim 1, further comprising a controller,
wherein the vehicle key module includes an antenna, and
wherein the controller performs communication with a vehicle using the antenna provided in the vehicle key module when the vehicle key module is inserted into the socket.

* * * * *